(12) United States Patent
Schoele et al.

(10) Patent No.: US 10,396,637 B2
(45) Date of Patent: Aug. 27, 2019

(54) ELECTRIC MOTOR AND RADIATOR FAN MODULE COMPRISING AN ELECTRIC MOTOR OF THIS TYPE

(71) Applicant: Brose Fahrzeugteile GmbH & Co. Kommanditgesellschaft, Würzburg, Würzburg (DE)

(72) Inventors: Rainer Schoele, Leinach (DE); Martin Pfister, Wiesentheid (DE); Franziska Rohm, Würzburg (DE); Kevin Ludwig, Würzburg (DE); Georg Winheim, Gemünden am Main (DE)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 126 days.

(21) Appl. No.: 15/787,748

(22) Filed: Oct. 19, 2017

(65) Prior Publication Data
US 2018/0152082 A1 May 31, 2018

(30) Foreign Application Priority Data

Nov. 30, 2016 (DE) .................. 10 2016 223 844

(51) Int. Cl.
*H02K 1/04* (2006.01)
*H02K 11/40* (2016.01)
(Continued)

(52) U.S. Cl.
CPC ............ *H02K 11/40* (2016.01); *F01P 5/04* (2013.01); *H02K 1/04* (2013.01); *H02K 1/185* (2013.01);
(Continued)

(58) Field of Classification Search
CPC .......... H02K 5/06; H02K 5/225; H02K 11/40; H02K 2203/15; H02K 7/14
(Continued)

(56) References Cited

U.S. PATENT DOCUMENTS 4,233,534 A * 11/1980 Tharman ............... H02K 5/225
310/68 D
6,215,214 B1 * 4/2001 Fisher ..................... H02K 5/04
310/85
(Continued)

FOREIGN PATENT DOCUMENTS

DE         3417266 A1    11/1985
DE    102012006020 A1     9/2013
(Continued)

OTHER PUBLICATIONS

Search Report in DE 102016223844.2 dated Oct. 19, 2017.
Search Report in EP 17204612 dated May 8, 2018.

*Primary Examiner* — Thanh Lam
(74) *Attorney, Agent, or Firm* — Manelli Selter PLLC; Edward Stemberger

(57) ABSTRACT

The present invention relates to an electric motor, the electric motor including: a stator, which is composed of layered metal sheets, a motor support made of an electrically conductive material, a cable connection comprising an earth line cable, and at least one connecting and contacting element made of an electrically conductive material, wherein the connecting and contacting element is configured and arranged on the electric motor such that it provides an earth connection between the stator and the motor support or between the stator and the earth line cable of the cable connection, and wherein the stator and the motor support are fastened to one another independently of the connecting and contacting element.

19 Claims, 9 Drawing Sheets

(51) Int. Cl.
  *F01P 5/04*    (2006.01)
  *H02K 1/18*    (2006.01)
  *H02K 7/14*    (2006.01)
  *H02K 5/22*    (2006.01)
  *H02K 5/06*    (2006.01)

(52) U.S. Cl.
  CPC .............. *H02K 5/225* (2013.01); *H02K 7/14* (2013.01); *F01P 2005/046* (2013.01); *H02K 5/06* (2013.01); *H02K 2203/15* (2013.01)

(58) Field of Classification Search
  USPC .................................... 310/43, 68 R, 71, 72
  See application file for complete search history.

(56) References Cited

U.S. PATENT DOCUMENTS

| | | | | |
|---|---|---|---|---|
| 6,404,086 B1* | 6/2002 | Fukasaku | .............. | F16F 1/3873 |
| | | | | 310/156.08 |
| 7,250,700 B2* | 7/2007 | Maki-Ontto | ........... | H02K 11/01 |
| | | | | 310/215 |
| 7,619,334 B2* | 11/2009 | Nanbu | .................. | H02K 3/522 |
| | | | | 310/216.074 |
| 8,987,955 B2* | 3/2015 | Mizukami | .............. | H02K 11/40 |
| | | | | 310/72 |
| 2002/0079781 A1 | 6/2002 | Walko et al. | | |
| 2011/0234025 A1 | 9/2011 | Kado et al. | | |

FOREIGN PATENT DOCUMENTS

| DE | 102012222683 A1 | 6/2014 |
|---|---|---|
| DE | 102013105965 A1 | 12/2014 |
| EP | 1705778 A1 | 9/2006 |
| EP | 1608052 B1 | 3/2012 |

* cited by examiner

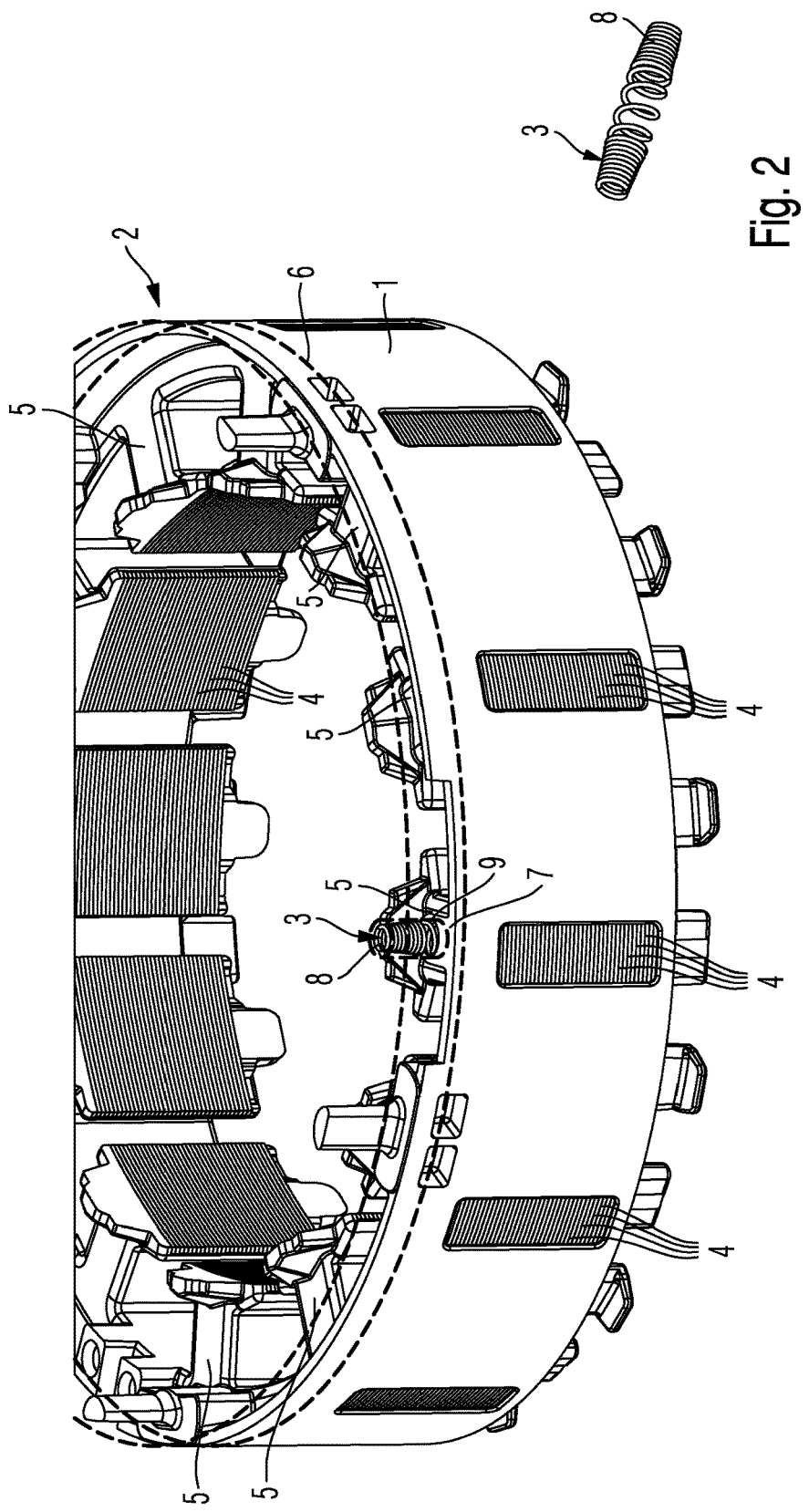

ELECTRIC MOTOR AND RADIATOR FAN MODULE COMPRISING AN ELECTRIC MOTOR OF THIS TYPE

FIELD

The present invention relates to an electric motor and a radiator fan module comprising an electric motor of this type, in particular a radiator fan module for a motor vehicle.

TECHNICAL BACKGROUND

In existing electric motors, discharge occurs via an earth connection of the wound stator of said electric motors to the motor support of said electric motors by means of screws, in order to provide the electric motor with the required electromagnetic compatibility (EMC).

Furthermore, DE 10 2012 222683 A1 discloses an electric motor comprising a housing which is closed by means of a cover and comprises a connector part held between the housing and the cover for electrically contacting the electric motor. The housing is in this case manufactured from steel, the connector part from plastics material and the cover from an electrically conductive material. In this case, a plurality of steel spring clips are arranged so as to be distributed over the periphery of the electric motor, which clips each engage behind the cover and the housing in a prestressed manner, such that the cover, housing and connector part are fastened to one another. An electrically conductive connection from the cover to the housing is established by means of the steel spring clips and the electrically conductive design of the cover, which connection can in particular be used as an earth terminal or earth connection for electrical/electronic components provided on the cover.

Because the steel spring clips are used to fasten the housing and the cover, they require additional installation space. Furthermore, a sufficient number of steel spring clips must be provided in order to fasten the housing and cover together in a satisfactory manner.

SUMMARY

Against this background, there is a need to provide an improved electric motor, in particular a radiator fan motor for a radiator fan module of a motor vehicle.

According to a first aspect, an electric motor, in particular for a radiator fan module of a motor vehicle, is provided which comprises: a stator, which is composed of layered metal sheets, a motor support made of an electrically conductive material, a cable connection comprising an earth line cable, and at least one connecting and contacting element made of an electrically conductive material, wherein the connecting and contacting element is constructed and arranged on the electric motor such that it provides an earth connection between the stator and the motor support and/or between the stator and the earth line cable of the cable connection, and wherein the stator and the motor support are fastened to one another independently of the connecting and contacting element.

Furthermore, according to a second aspect, a radiator fan module comprising an electric motor of this type is provided.

The concept underlying the invention is that of the earth connection being established independently of the motor support being fastened to the stator by the stator and the motor and/or the earth line cable of the cable connection being connected to and brought into electrical contact with the stator by means of at least one connecting and contacting element. According to the invention, the motor support is made of a conductive material and the motor support is connected to the stator via the at least one connecting and contacting element made of an electrically conductive material in order to electrically insulate the drive.

This has the advantage of it being possible to provide a space-saving and cost-effective earth connection in which the existing connection using screws can be dispensed with and, furthermore, in which no large, complex steel spring clips have to be provided which, along with the earth connection, must achieve secure fastening of the housing to the cover. Instead, the fastening of the motor support to the stator is decoupled by the earth connection and, as a result, the earth connection is greatly simplified and a greater degree of design freedom is possible for the connection of the stator to the motor support, since the earth connection does not have to be integrated for the fastening.

Advantageous embodiments and developments will become apparent from the additional dependent claims and from the description with reference to the figures of the drawings.

In an embodiment, the layered metal sheets of the stator are provided with an opening for receiving a first portion or first end of the at least one connecting and contacting element. The motor support is in turn provided with an opening for receiving a second portion or second end of the at least one connecting and contacting element, the at least one connecting and contacting element being received in the opening in the stator such that it electrically contacts at least one metal sheet of the stator and said element being received in the opening in the motor support such that it electrically contacts the motor support in order to provide the earth connection between the stator and the motor support. In this way, a space-saving and very cost-effective earth connection can be very easily provided.

In another embodiment, the connecting and contacting element is a spring element made of an electrically conductive material. The connecting and contacting element is in this case a coil spring, for example, it being possible for the coil spring to be cylindrical or spherical, for example. Spring elements of this type, in particular coil springs, are particularly good value and simple to install.

In another embodiment, plastics material is injection-molded around part of the stator as electrical insulation. Layered metal sheets of the stator may be left exposed on the outer periphery of the stator and thus not comprise plastics material injection-molded there-around as electrical insulation. Said exposed metal sheets on the outer periphery of the stator have the advantage that they can be used for electrical contacting by means of the at least one connecting and contacting element in order to establish an earth connection.

According to an embodiment, the connecting and contacting element is configured such that it electrically contacts at least one or more metal sheets on the outer periphery of the layered metal sheets of the stator around which plastics material is not injection-molded, and is arranged between the stator and the motor support such that it electrically contacts the motor support in order to provide the earth connection between the stator and the motor support. Therefore, an earth connection can very easily be established and in particular access to the metal sheets of the stator can be provided in order to electrically contact said metal sheets for the earth connection.

In an embodiment, the connecting and contacting element is a clip, in particular an L-shaped clip, made of an electrically conductive material. A first or upper end of the clip electrically contacts the at least one exposed metal sheet of the stator around which plastics material is not injection-molded. A second or lower end of the clip is in turn configured to engage behind the stator and to electrically contact the motor support located opposite the stator. The clip has the advantage that it can be produced as a stamped and bent part in a simple and cost-effective manner, since it has a very simple shape.

In another embodiment, the clip comprises a contact surface on the upper end thereof, by means of which the clip, when installed, is prestressed against layered exposed metal sheets of the stator around which plastics material is not injection-molded, in order to electrically contact at least one of the metal sheets. By virtue of the contact surface, the clip has a defined surface by means of which it can electrically contact the exposed layered metal sheets of the stator around which plastics material is not injection-molded. The clip has the advantage that it requires very little installation space and in particular does not project very far beyond the outer periphery of the stator, in contrast with the steel spring clips of the prior art mentioned in the introductory part of the description, which take up a lot of space.

In an embodiment, the connecting and contacting element is fastened to the motor support as a pin made of an electrically conductive material and can be inserted into an associated opening in the layered metal sheets of the stator such that it electrically contacts at least one or more of the layered metal sheets in order to provide the earth connection between the stator and the motor support. In this way, a very simple, cost-effective, easy-to-install and space-saving earth connection can likewise be provided. The relevant pin can, for example, be integrally cast on the motor support such that it does not have to be installed separately. Likewise, the relevant pin can also be fastened to or mounted on the motor support as a separate component.

According to an embodiment, the connecting and contacting element is configured as an extension of at least one of the layered metal sheets of the stator on the outer periphery of the stator and is guided out from the stator to the motor support such that it electrically contacts the motor support in order to provide the earth connection between the stator and the motor support. As a result, a separate connecting and contacting element can be dispensed with and the installation and production costs can additionally be reduced.

In an embodiment, the at least one metal sheet that is extended to the motor support has no electrical insulation, in particular no electrically insulating coating, on the side intended to contact the motor support, and therefore electrical contacting between the motor support and the at least one extended metal sheet that is bent over the outer periphery of the motor support can be produced very easily and without difficulty.

In another embodiment, the electric motor comprises a pressed screen, the pressed screen being provided with the at least one connecting and contacting element on the side facing the stator, the connecting and contacting element being electrically connected to the earth line cable of the cable connection and being received in an associated opening in the layered metal sheets of the stator such that said element electrically contacts at least one of the layered metal sheets in order to provide the earth connection between the stator and the earth line cable of the cable connection. In this way, an earth connection can also be provided directly between the cable connection and the stator, only the pressed screen having to be provided with an additional connecting and contacting element for this purpose, which is simple and cost-effective to implement.

In another embodiment, the connecting and contacting element is configured as a contact pin made of an electrically conductive material on the pressed screen and formed or extended towards the stator and the opening therein for receiving the contact pin and, in addition, guided out through the cable connection and the casing thereof, for example made of a sealing and/or electrically insulating material.

Where appropriate, the above-mentioned configurations and developments can be combined in any manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

SUMMARY OF THE DRAWINGS

The present invention is explained below in greater detail with reference to the embodiments specified in the schematic figures of the drawings, in which:

FIG. 1 shows a detail of an electric motor according to a first embodiment of the invention;

FIG. 2 is a perspective view of a connecting and contacting element according to the invention for use in the electric motor according to FIG. 1;

Figures 3, 4:
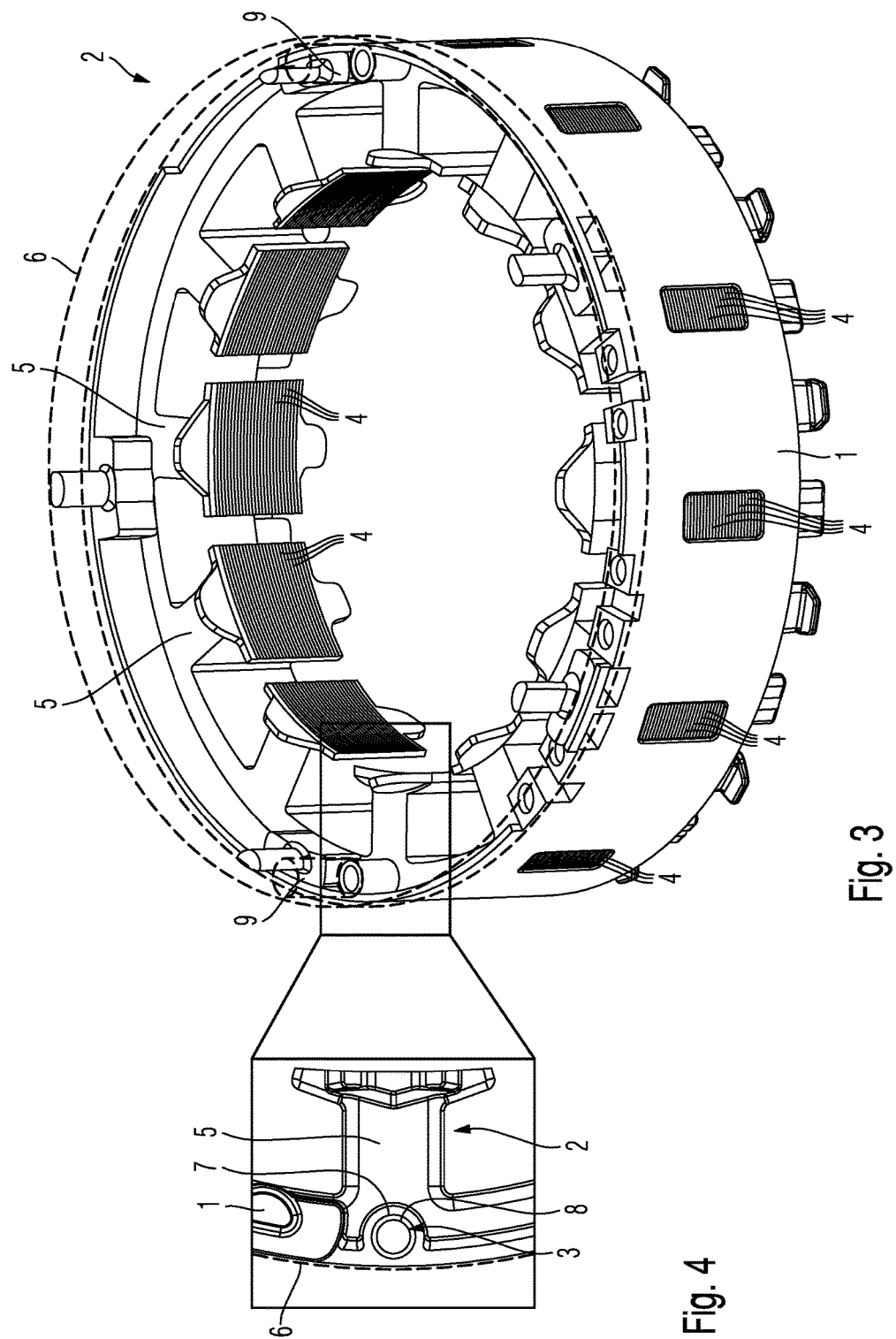
FIG. 3 is another perspective view of the electric motor according to FIG. 1.
FIG. 4 shows an enlarged detail of the electric motor according to FIG. 3.

The accompanying drawings are intended to provide further understanding of the embodiments of the invention. They illustrate embodiments and, together with the description, are used to explain principles and concepts of the invention. Other embodiments and many of the mentioned advantages will become apparent from the drawings. The elements of the drawings are not necessarily shown to scale relative to one another.

In the figures of the drawings, identical, functionally identical and identically operating elements, features and components are provided in each case with the same reference numerals, unless indicated otherwise.

DESCRIPTION OF EXAMPLE EMBODIMENTS

FIG. 1 shows a detail of a claimed electric motor 2 according to a first embodiment of the invention. Furthermore, FIG. 2 is a perspective view of a connecting and contacting element 3 according to the invention for use in the electric motor 2 according to FIG. 1. Furthermore, FIG. 3 is another perspective view of the electric motor 2 according to FIG. 1 and FIG. 4 shows an enlarged detail of the electric motor 2 according to FIG. 3.

The electric motor 2 according to the invention comprises the stator 1, as shown in FIGS. 1, 3 and 4. The stator 1 comprises layered metal sheets 4, between each of which sheets 4 electrical insulation, e.g. an electrical insulation layer, is provided. The stator 1 further comprises a plurality of stator teeth 5, which are provided with coil windings (not shown), for providing for example a multi-phase, e.g. three-phase, rotating-field winding. The coil windings are not shown in FIGS. 1, 3 and 4 for reasons of clarity.

In the embodiment in FIGS. 1, 3 and 4, plastics material is injection-molded around part of the stator 1 composed of layered metal sheets 4. In this case, the layered metal sheets 4, for example in the region of the relevant stator tooth 5, may be left exposed without plastics material being injection-molded there-around, as shown in the embodiment in FIGS. 1, 3 and 4.

The electric motor 2 further comprises a rotor (not shown), which is rotatably mounted inside the stator 1 on a rotor shaft.

Moreover, the electric motor 2 comprises a motor support 6, which is indicated by a dashed line in FIGS. 1, 3 and 4.

In order to establish an earth connection, in this case between the stator 1 and the motor support 6, in the stator 1 of the electric motor 2 according to the first embodiment of the invention, an opening 7, e.g. a through-opening, slit, slot or recess, is provided at at least one point on the stator 1, as shown in FIGS. 1, 3 and 4, in which opening a first portion of an electrically conductive spring element 8, preferably an electrically conductive coil spring, can be received such that at least one or more metal sheets of the layered metal sheets 4 of the stator 1 are contacted. A second portion of the spring element 8 can in turn be received in an associated opening 9, e.g. a through-opening, slit, slot or recess, in the motor support 6 and can be brought into contact therewith. The motor support 6 is produced from an electrically conductive material, for example aluminium, an aluminium alloy, copper, a copper alloy, an electrically conductive plastics material and/or steel.

As a result, an earth connection between the layered metal sheets 4 of the stator 1 and the motor support 6 is provided by means of the spring element 8 as the connecting and contacting element 3, without an earth connection between the wound stator and the motor support thereof being established by means of screws, as has been the case up until now. Furthermore, the spring element 8 is not used as an additional fastening for the motor support 6 and stator 1, but is preferably exclusively used to provide an earth connection between the stator 1 and motor support 6. Instead, the stator and the motor support are fastened to one another by means of their own fastening means, e.g. screws, and/or fastening methods, e.g. caulking. This applies to all embodiments of the invention.

Accordingly, the spring element 8 can be arranged inside the stator 1 in a space-saving manner.

Figures 5, 6:
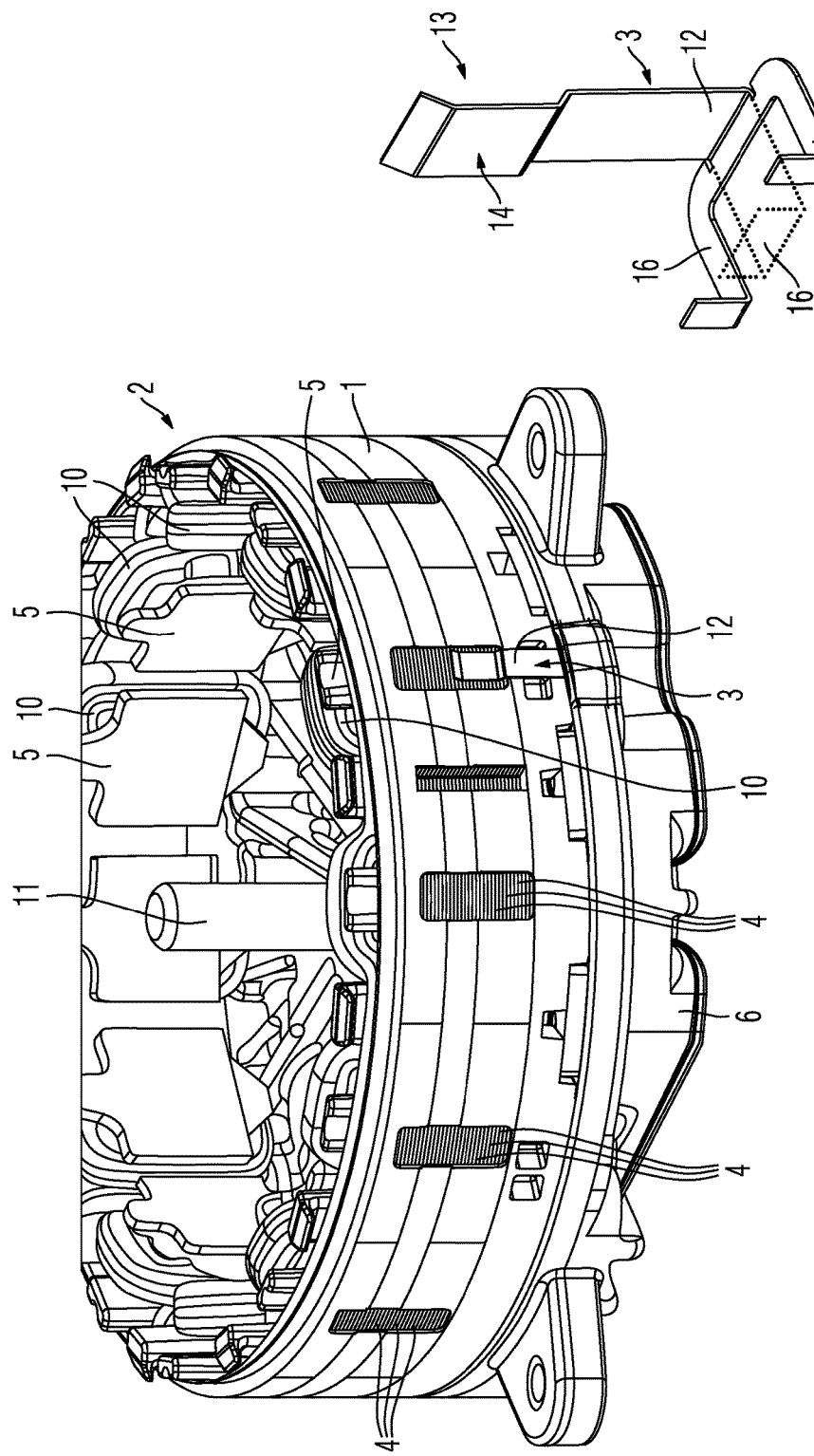
FIG. 5 is a perspective view of an electric motor according to a second embodiment of the invention.
FIG. 6 is a perspective view of a connecting and contacting element according to the invention for use in the electric motor according to FIG. 5.
Figure 7:
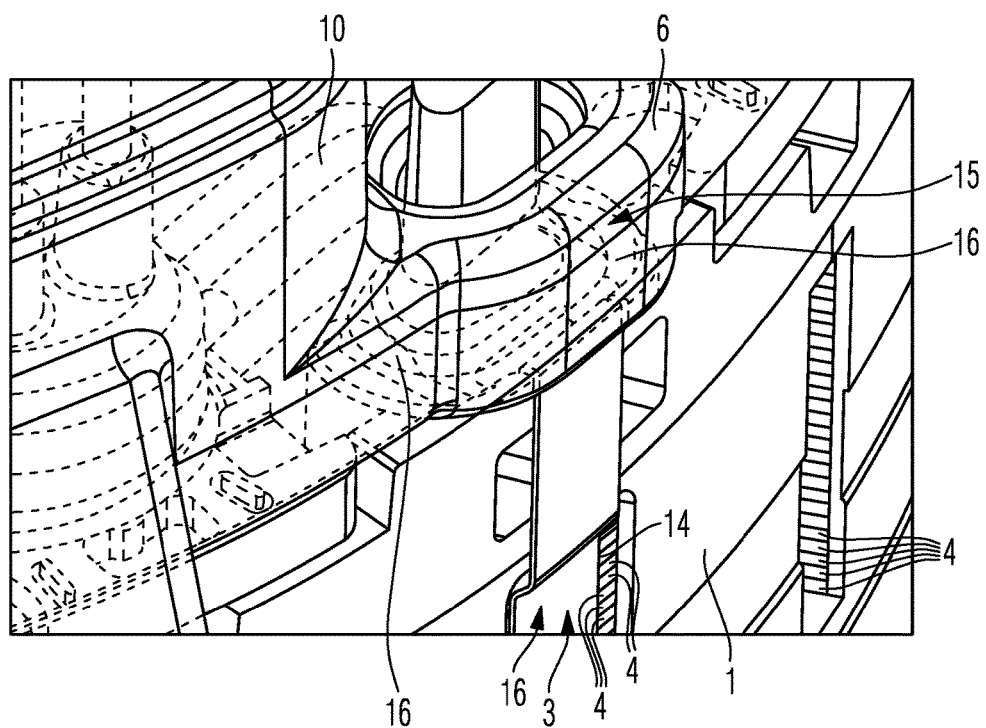
FIG. 7 shows an enlarged detail of the electric motor according to FIG. 5.
Figure 8:
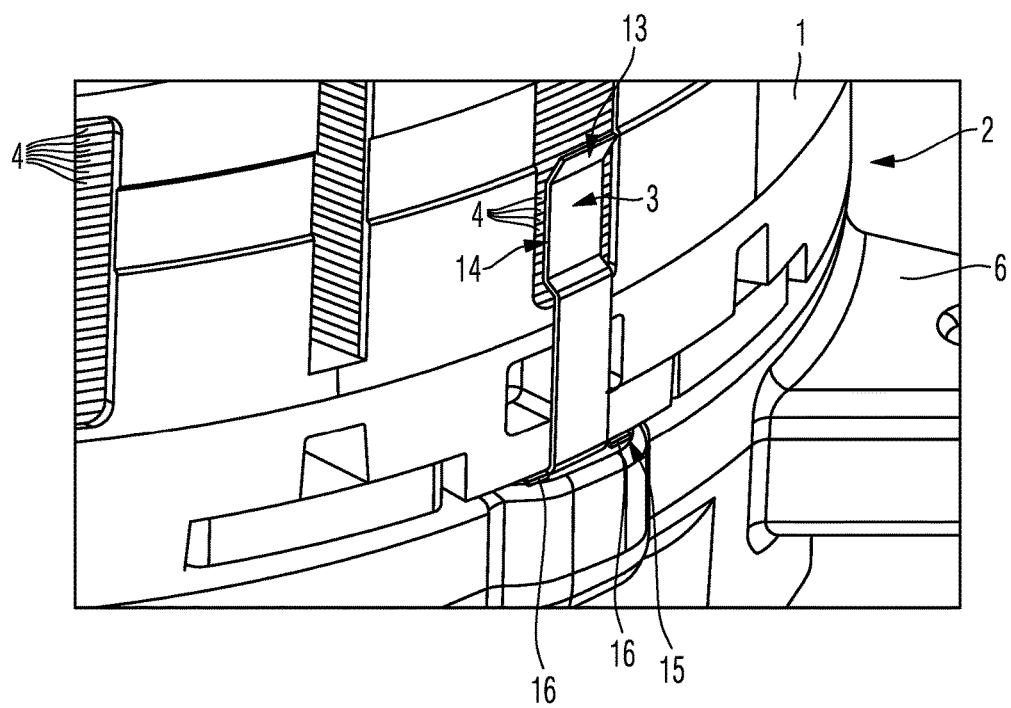
FIG. 8 shows another enlarged detail of the electric motor according to FIG. 5.

In FIG. 5-8, a second embodiment of the electric motor 2 according to the invention is shown. FIG. 5 is a perspective view of a detail of a stator 1 comprising coil windings 10, of a motor support 6 and of a rotor shaft 11 of the electric motor 2 according to the second embodiment of the invention. Furthermore, FIG. 6 is a perspective view of a connecting and contacting element 3 according to the invention for use in the stator 1 according to FIG. 5. FIGS. 7 and 8 each further show an enlarged detail of the electric motor 2 according to FIG. 5.

The second embodiment of the electric motor 2 has substantially the same design as the first embodiment of the electric motor, and therefore, in this respect, reference is made to the description of FIG. 1-4 in order to avoid unnecessary repetitions.

Furthermore, the second embodiment of the electric motor 2 differs from the first embodiment of the electric motor in that the earth connection is established by at least one electrically conductive clip 12 being provided as at least one connecting and contacting element 3, which clip connects layered metal sheets 4 of the stator 1 to the motor support 6 made of an electrically conductive material. An earth connection is also established between the stator 1 and the motor support 6 by means of the connecting and contacting element 3, in this case the clip 12.

As shown in FIGS. 5, 7 and 8, the stator 1, like the stator 1 in FIGS. 1, 3 and 4, is composed of layered metal sheets 4 and comprises a plurality of stator teeth 5 which are provided with coil windings 10, in order to provide, for example, a multi-phase, e.g. a three-phase, rotating-field winding.

Plastics material is also injection-molded around part of the stator 1 composed of layered metal sheets 4. In this case, at least in the region in which the metal sheets 4 or part of the metal sheets 4 come into contact with the connecting and contacting element 3, plastics material is not injection-molded around the layered metal sheets 4 on the outer periphery of the stator 1, but rather said sheets are exposed.

In the embodiment shown in FIGS. 5, 7 and 8, the layered metal sheets 4 on the outer periphery of the stator 1, for example in the region of the relevant stator tooth 5, are left exposed without plastics material being injection-molded there-around. However, the invention is not limited to this specific embodiment. The stator 1 may be left exposed at any other suitable point, with plastics material not additionally being injection-molded there-around, depending on the function and intended use.

As shown in FIG. 5-8, an electrically conductive L-shaped clip 12 is provided as the connecting and contacting element 3 in order to provide an earth connection. The L-shaped clip 12 comprises an upper end 13 having a resilient portion comprising a contact surface 14. The resilient portion together with its contact surface 14 is clipped against a portion of the exposed layered metal sheets 4 on the outer periphery of the stator 1. The contact surface 14 of the electrically conductive L-shaped clip 12 contacts a plurality of exposed layered metal sheets 4 on the outer periphery of the stator 1. The lower end 15 of the L-shaped clip 12 is configured such that it is clipped between the stator 1 and the motor support 6 and such that it additionally engages around or engages behind the stator 1, for example, as shown for example in FIG. 7, while also contacting the motor support 6.

As a result, the L-shaped clip 12 can be fastened in a reliable manner to the stator 1, and at the same time contacts the motor support 6 and exposed layered metal sheets 4 of the stator 1 as well. The contact surface 14 of the upper end 13 of the L-shaped clip 12 may be clipped or prestressed against exposed layered metal sheets 4 of the stator 1.

In the embodiment of the L-shaped clip 12 made of an electrically conductive material shown in FIG. 6, the lower end 15 of said clip is configured for example as a fork having two projecting strips 16, the end portions of which are bent in order to engage behind or around the stator 1. The fork-shaped lower end 15 has the advantage that it provides a particularly stable support for the L-shaped clip 12 on the stator 1 and the motor support 6 located opposite. However, the L-shaped clip 12 is not limited to the specific embodiment shown in FIG. 6. In particular, the L-shaped clip 12 may also comprise only one projecting strip 16, having a bent end portion, as the lower end 15, as indicated in FIG. 6 by a dotted line, or may also be combined with the fork-shaped design and comprise, for example, three projecting strips having bent end portions, etc.

An L-shaped clip 12 of this type, as shown in FIG. 6, can be produced as a stamped and bent part from a metal sheet in a very simple and cost-effective manner, and is furthermore very easy to install.

Figure 9:
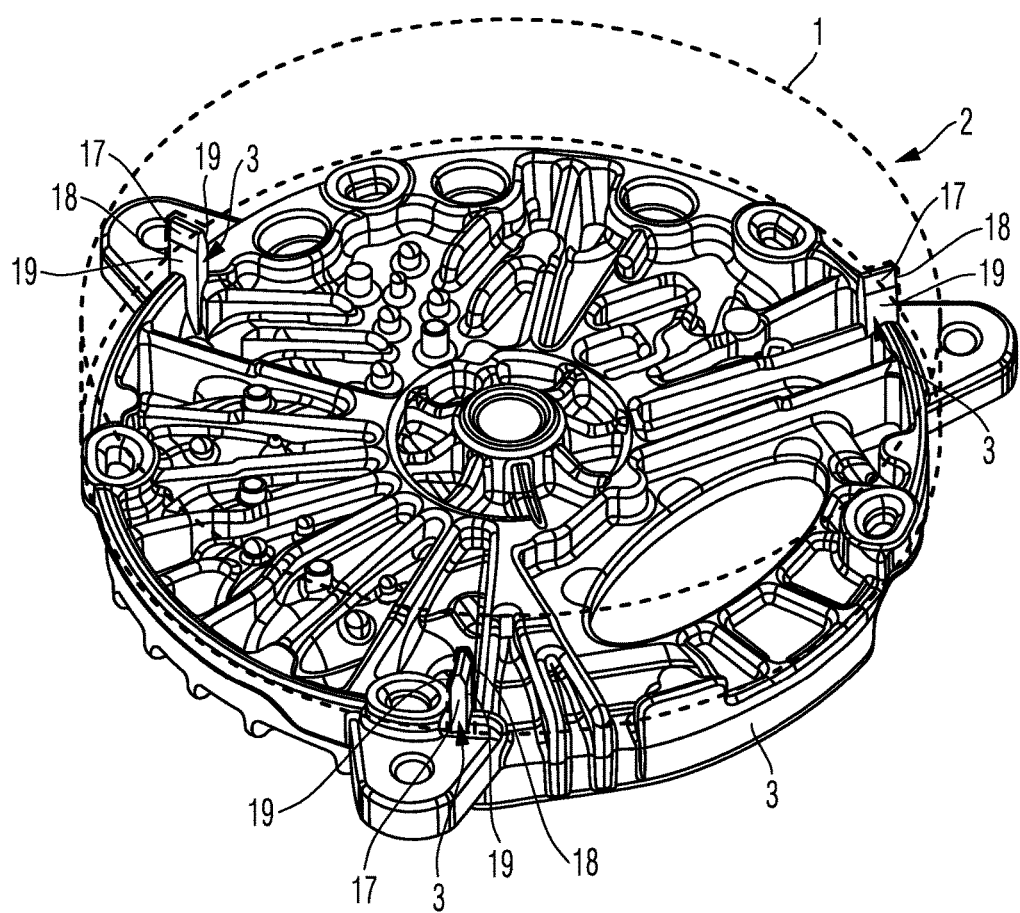
FIG. 9 is a perspective view of an electric motor according to a third embodiment of the invention.

Furthermore, FIG. 9 shows a third embodiment of an electric motor 2 according to the invention. FIG. 9 is a perspective view of a motor support 6 of the electric motor 2 according to the invention and a stator 1. In FIG. 9, the stator 1 is indicated in a purely schematic and highly simplified manner by a dashed line.

The third embodiment of the electric motor 2 has substantially the same design as the electric motors in the first and second embodiments of the invention, and therefore, in this respect, reference is made to the description thereof with regard to FIG. 1-8 in order to avoid unnecessary repetitions.

Furthermore, the third embodiment of the electric motor 2 differs from the first embodiment and the second embodiment in that the motor support 6 comprises a connecting and contacting element 3 in the form of a pin 17 made of an electrically conductive material, which is for example inserted or embedded in said motor support. In order to establish an earth connection, said pin 17 is received in an opening 18 corresponding thereto in the layered metal sheets 4 of the stator 1 such that the pin 17 contacts layered metal sheets 4 of the stator 1.

The opening 18 in the layered metal sheets can for example be a through-opening, a recess or a slit, as shown in FIG. 9. The pin 17 in FIG. 9 is configured to have broad lateral surfaces 19 which function as contact surfaces for contacting layered metal sheets 4 of the stator 1 when the pin 17 is received in the associated opening 18 in the stator 1.

The pin 17 shown in FIG. 9 is configured, for example, as a rectangular pin having a bevelled tip and two broad lateral surfaces 19. However, said pin may also have any other shape that is suitable for being received in an associated opening 18 in layered metal sheets 4 of the stator 1 and for contacting layered metal sheets 4 of the stator 1. For example, the pin 17 may also be cylindrical and, for example, have a flat end or a round tip, etc.

A pin 17 of this type is also very easy and cost-effective to produce, for example from metal or an electrically conductive plastics material. The pin 17 may be fastened to the motor support 6 as a separate component or may be integrally formed with the motor support 6. For example, the pin 17 may be molded, pressed, clipped, glued, screwed and/or welded, etc., into the motor support 6.

Figure 10:
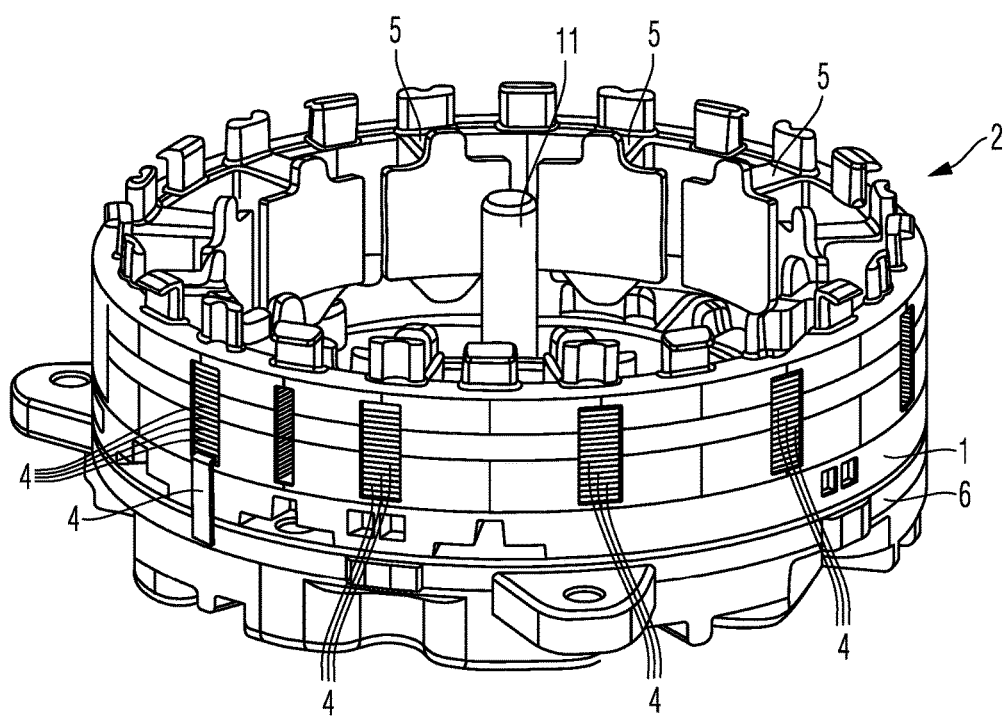
FIG. 10 is a perspective view of an electric motor according to a fourth embodiment of the invention.
Figure 11:
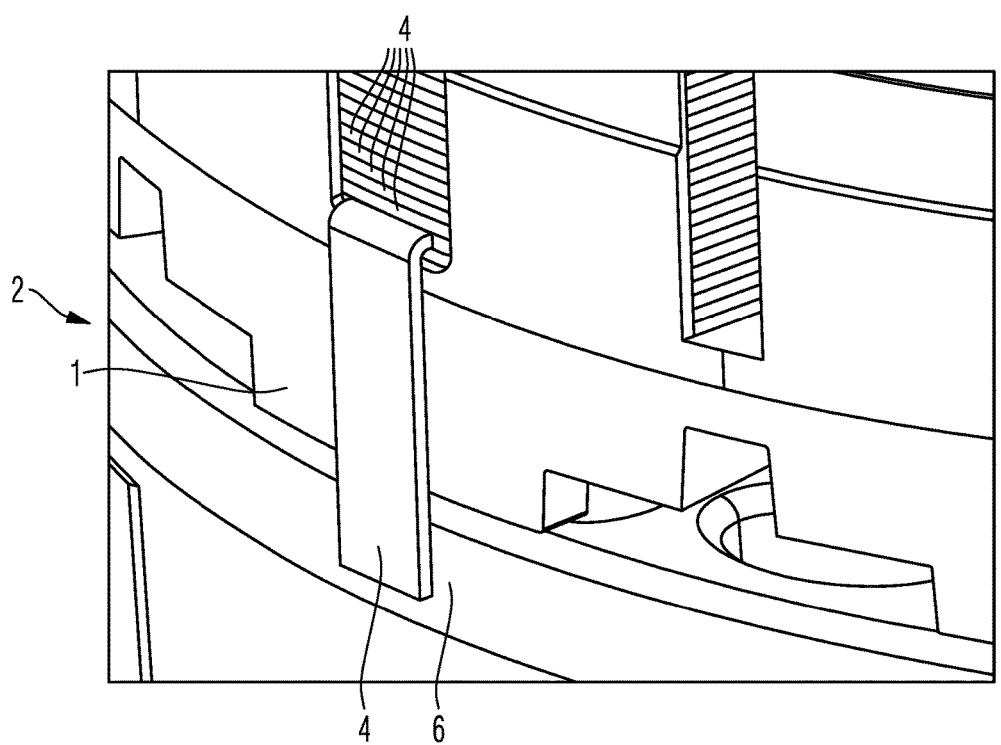
FIG. 11 shows an enlarged detail of the electric motor according to FIG. 10.

FIGS. 10 and 11 show a fourth embodiment of an electric motor 2 according to the invention. FIG. 10 is a perspective view of a detail of a stator 1, a motor support 6 and a rotor shaft 11 of the electric motor 2 according to the fourth embodiment of the invention. Furthermore, FIG. 11 is an enlarged detail of the electric motor 2 according to FIG. 10.

The fourth embodiment of the electric motor 2 has substantially the same design as the electric motors in the first, second and third embodiments of the invention, and therefore reference is made to the description thereof with regard to FIG. 1-9 in order to avoid unnecessary repetitions.

Furthermore, the fourth embodiment of the electric motor 2 differs from the first, second and third embodiments in that one of the layered metal sheets 4 of the stator 1, which is left exposed on the outer periphery of the stator 1 without plastics material being injection-molded there-around, is extended outwards such that it rests on a portion of the outer periphery of the motor support 6 and contacts same. The extended metal sheet 4 of the stator 1 in this case has no electrical insulation, e.g. electrically insulating coating, at least in the region in which it contacts the motor support 6 made of an electrically conductive material. Otherwise, the stator 1, as previously described, is composed of the layered metal sheets 4, between each of which sheets 4 electrical insulation, e.g. an electrical insulation layer, is provided.

As already described earlier, the motor support 6 is made of an electrically conductive material. An earth connection can therefore be provided by bringing the motor support 6 into contact with the extended metal sheet 4 of the stator 1. Furthermore, the extended metal sheet 4 may preferably additionally be prestressed against the motor support 6 in order to additionally improve the contact between the metal sheet of the stator and the motor support 6. In this way, a highly space-saving and cost-effective earth connection is achieved.

Figure 12:
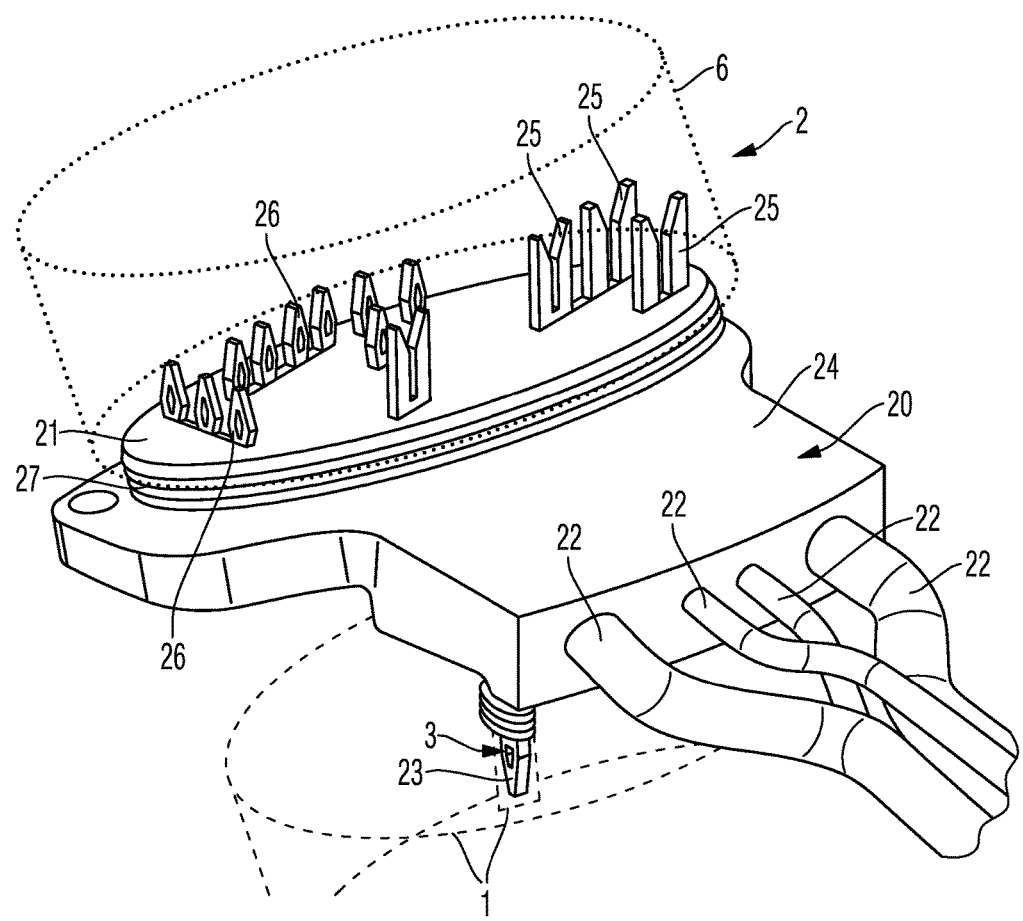
FIG. 12 is a perspective view of an electric motor according to a fifth embodiment of the invention.

Furthermore, FIG. 12 shows a fifth embodiment of an electric motor 2 according to the invention. FIG. 12 is a perspective view of a stator 1, a motor support 6 and a cable connection 20 of the electric motor 2 according to the fifth embodiment of the invention. In FIG. 12, the stator 1 is indicated in a purely schematic and highly simplified manner by a dashed line, and the motor support 6 is likewise indicated in a purely schematic and highly simplified manner by a dotted line.

The fifth embodiment of the electric motor 2 has substantially the same design as the electric motors in the first, second, third and fourth embodiments of the invention, and therefore reference is made to the description thereof with regard to FIG. 1-11 in order to avoid unnecessary repetitions.

Furthermore, the fifth embodiment of the electric motor 2 differs from the first, second, third and fourth embodiment in that a pressed screen 21, which is connected to the cable connection 20 and electrically contacts cables 22 of the cable connection 20, is configured to have an additional connecting and contacting element 3 on the side thereof facing the stator 1.

The connecting and contacting element 3 is in the form of a contact pin 23 made of an electrically conductive material, e.g. metal, such as copper or a copper alloy, etc., or an electrically conductive plastics material.

The contact pin 23 is electrically connected to an earth line cable of the cable connection 20 and is guided to the stator 1 out through the cable connection 20, around which a sealing and/or electrically insulating material 24 is injection-molded, and is inserted in an opening in the layered metal sheets 4 of the stator 1 such that the contact pin 23 contacts one or more of the layered metal sheets 4 and establishes an earth connection. In this way, the contact pin 23 provides an earth connection between the cable connection 20 and the stator 1. The axially open surface of the stator 1 and the layered metal sheets 4 thereof are contacted. Kebaflex®, for example, can be used as the sealing and/or electrically insulating material 24.

Furthermore, as shown in FIG. 12, a plurality of insulation displacement connectors 25 and a press-fit contact 26, for example, are provided on the side of the pressed screen 21 facing the motor support 6 for electrical connection to components of the motor support 6. Moreover, a seal, for example a silicone seal or a seal made of TPE or an elastomer, etc., is provided in this case on the outer side of the pressed screen 21 opposite the motor support 6. The insulation displacement connectors 25 extend in the direction of the motor support 6 and contact a circuit board or PCB, and the contact pin 23 in turn contacts the stator packet.

However, the invention is not limited to this specific embodiment of the pressed screen comprising insulation displacement connectors and press-fit contacts. Any other form of pressed screen comprising contacts may be provided that is suitable for use in an electric motor and can be provided with at least one contact pin 23.

Although the present invention has hitherto been described entirely by way of preferred embodiments, it is not limited thereto, but can be modified in various ways. In particular, the various embodiments of the electric motor, as described previously with reference to FIG. 1-12, in particular individual features thereof, can also be combined. In the previously described embodiments of the electric motor according to the invention, at least one or more connecting and contacting elements may be provided in order to provide an earth connection. In particular, the connecting and contacting elements in the five embodiments, as described with reference to FIG. 1-12, can also be combined.

As already explained, the stator and motor support in the electric motor according to the invention described previously with reference to FIG. 1-12 are connected independently of the connecting and contacting element(s). The relevant connecting and contacting element is configured to provide an earth connection, in particular between the stator and motor support or, as in FIG. 12, between the cable connection and stator.

Although the present invention has been described in the above by way of preferred embodiments, it is not limited thereto, but rather can be modified in a wide range of ways. In particular, the invention can be changed or modified in various ways without deviating from the core of the invention.

LIST OF USED REFERENCE SIGNS 1 stator
2 electric motor
3 connecting and contacting element
4 metal sheet
5 stator tooth
6 motor support
7 opening
8 spring element
9 opening
10 coil winding
11 rotor shaft (comprising rotor axis)
12 clip
13 upper end
14 contact surface
15 lower end
16 projecting strip
17 pin
18 opening
19 lateral surface
20 cable connection
21 pressed screen
22 cable
23 contact pin
24 sealing and/or electrically insulating material
25 insulation displacement connector
26 press-fit contact

The invention claimed is:

1. An electric motor, the electric motor comprising:
a stator which is composed of layered metal sheets,
a motor support made of an electrically conductive material,
a cable connection comprising an earth line cable, and
at least one connecting and contacting element made of an electrically conductive material,
wherein the connecting and contacting element is constructed and arranged on the electric motor such that it provides an earth connection between the stator and the motor support or between the stator and the earth line cable of the cable connection, and
wherein the stator and the motor support are fastened to one another independently of the connecting and contacting element.

2. The electric motor of claim 1, wherein:
the layered metal sheets of the stator are configured to have an opening for receiving a first portion of the at least one connecting and contacting element,
the motor support is configured to have an opening for receiving a second portion of the at least one connecting and contacting element,
the at least one connecting and contacting element being received in the opening in the stator such that it electrically contacts at least one metal sheet of the stator and said element being received in the opening in the motor support such that it electrically contacts the motor support in order to provide the earth connection between the stator and the motor support.

3. The electric motor of claim 1, wherein the connecting and contacting element is a spring element made of an electrically conductive material.

4. The electric motor of claim 3, wherein the spring is a cylindrical or spherical coil spring.

5. The electric motor of claim 1, wherein plastics material is injection-molded around part of the stator as electrical insulation.

6. The electric motor of claim 1, wherein layered metal sheets of the stator are left exposed on the outer periphery of the stator and thus not comprise plastics material injection-molded there-around as electrical insulation.

7. The electric motor of claim 1, wherein the connecting and contacting element is configured such that it electrically contacts at least one metal sheet on the outer periphery of the layered metal sheets of the stator around which plastics material is not injection-molded, and is arranged between the stator and the motor support such that it electrically contacts the motor support in order to provide the earth connection between the stator and the motor support.

8. The electric motor of claim 7, wherein the connecting and contacting element is a clip made of an electrically conductive material, an upper end of the clip electrically contacting the at least one exposed metal sheet of the stator around which plastics material is not injection-molded, and a lower end of the clip being configured to engage behind the stator and to electrically contact the motor support located opposite the stator.

9. The electric motor of claim 8, wherein the clip is an L-shaped clip.

10. The electric motor of claim 8, wherein the clip comprises a contact surface on the upper end thereof, by means of which the clip is prestressed against layered exposed metal sheets of the stator around which plastics material is not injection-molded, in order to electrically contact at least one of the metal sheets.

11. The electric motor of claim 1, wherein the connecting and contacting element is fastened to the motor support as a pin made of an electrically conductive material and can be inserted into an associated opening in the layered metal sheets of the stator such that it electrically contacts at least one of the layered metal sheets in order to provide the earth connection between the stator and the motor support.

12. The electric motor of claim 1, wherein the connecting and contacting element is guided out on the outer periphery of the stator as an extension of at least one of the layered metal sheets of the stator and is guided to the outer periphery of the motor support and is configured such that it electrically contacts the motor support in order to provide the earth connection between the stator and the motor support.

13. The electric motor of claim 12, wherein the at least one metal sheet that is extended to the motor support has no electrical insulation on the side intended to contact the motor support.

14. The electric motor of claim 13, wherein the at least one metal sheet has no electrically insulating coating on the side intended to contact the motor support.

15. The electric motor of claim 1, wherein the electric motor comprises a pressed screen, the pressed screen being provided with the at least one connecting and contacting element on the side facing the stator, the connecting and contacting element being electrically connected to the earth line cable of the cable connection and being received in an associated opening in the layered metal sheets of the stator such that said element electrically contacts at least one of the layered metal sheets in order to provide the earth connection between the stator and the earth line cable of the cable connection.

16. The electric motor of claim 1, wherein the connecting and contacting element is configured as a contact pin made of an electrically conductive material on the pressed screen and formed or extended towards the stator and the opening therein for receiving the contact pin.

17. The electric motor of claim 1, wherein the electric motor is an electric motor for a radiator fan module of a motor vehicle.

18. A radiator fan module for a motor vehicle, the radiator fan module comprising an electric motor electric motor, the electric motor comprising:
 a stator which is composed of layered metal sheets,
 a motor support made of an electrically conductive material,
 a cable connection comprising an earth line cable, and
 at least one connecting and contacting element made of an electrically conductive material,
 wherein the connecting and contacting element is configured and arranged on the electric motor such that it provides an earth connection between the stator and the motor support or between the stator and the earth line cable of the cable connection, and
 wherein the stator and the motor support are fastened to one another independently of the connecting and contacting element.

19. The radiator fan module of claim 18, further comprising an impeller, wherein the electric motor is configured and arranged such to drive the impeller.

* * * * *